United States Patent [19]

Swain

[11] Patent Number: 5,724,945
[45] Date of Patent: Mar. 10, 1998

[54] CARBURETOR AIR/FUEL RATIO CONTROL FOR SINGLE CYLINDER ENGINES

[75] Inventor: James C. Swain, Columbus, Ohio

[73] Assignee: Gas Research Institute, Chicago, Ill.

[21] Appl. No.: 710,558

[22] Filed: Sep. 18, 1996

[51] Int. Cl.⁶ .................................................. F02M 17/14
[52] U.S. Cl. ............................................................. 123/437
[58] Field of Search .................................... 123/437, 438

[56] References Cited

U.S. PATENT DOCUMENTS

| | | | |
|---|---|---|---|
| 806,822 | 12/1905 | Millard | 123/549 X |
| 2,310,984 | 2/1943 | Mock et al. | 261/69.2 |
| 2,884,918 | 5/1959 | Klug | 123/445 |
| 3,667,440 | 6/1972 | Yoshino | 123/512 |
| 3,931,814 | 1/1976 | Rivere | 123/438 |
| 4,044,746 | 8/1977 | Kaye | 123/511 |
| 4,055,609 | 10/1977 | Phelps | 261/36.2 |
| 4,186,707 | 2/1980 | Driggers | 123/512 |
| 4,300,502 | 11/1981 | Driggers | 123/389 |
| 4,745,904 | 5/1988 | Cagle | 123/512 |
| 5,372,158 | 12/1994 | Ziegelmeyer et al. | 137/510.14 |

FOREIGN PATENT DOCUMENTS 5770948  5/1992  Japan .

*Primary Examiner*—Tony M. Argenbright
*Attorney, Agent, or Firm*—Dick and Harris

[57] ABSTRACT

An apparatus for controlling air/fuel ratio in a carburetted single cylinder internal combustion engine, including an apparatus for preventing fuel from being drawn into a carburetor, and, in turn, toward the cylinder inlet, as a result of air flow oscillations occurring during the portion of an engine cycle in which the at least one inlet valve is closed.

14 Claims, 1 Drawing Sheet

CARBURETOR AIR/FUEL RATIO CONTROL FOR SINGLE CYLINDER ENGINES

BACKGROUND OF THE INVENTION

1. Field of the Invention

The present invention relates to carburetors and related components for single cylinder reciprocating internal combustion engines.

2. The Prior Art

In order to achieve improved efficiency and lowest emissions in carburetted, reciprocating single cylinder internal combustion engines, it is important to provide as much control as possible over the engine air/fuel ratio, during as many conditions of engine operation as possible. It has been determined that in that portion of a four-stroke engine cycle in which the air/fuel inlet valve(s) to the cylinder is/are closed, rapid air flow oscillations can sometimes occur in the carburetor throat, even though no air is flowing into the cylinder.

During the negative pressure portion of the oscillations, fuel flow can be induced into the carburetor from the fuel supply. This is particularly evident in engines which are powered by gaseous fuels, such as natural gas, propane, etc. This behavior can influence the air/fuel ratio control of the carburetor. It has been shown that during certain engine speed ranges, this undesirable influence on the air/fuel ratio can be substantial.

Although engine designers can largely eliminate this oscillation behavior by making design changes to the engine induction systems, such efforts are difficult and time consuming. In addition, should any alterations to the engine's induction system be made subsequent to the manufacture of the engine, it is possible that the undesired oscillation phenomenon may be restored as a result of such modifications.

One proposed solution to the oscillation problem which has been considered is the installation of a check valve in the air flow immediately adjacent to the carburetor. Such a check valve would act to prevent oscillations, backward flow through the carburetor, and the exposure of the carburetor throat to vacuum, and thus prevent the induced flow of fuel into the carburetor. However, such check valves would have to have a rapid response capability, low pressure drop and have a duty life commensurate with the duty life of the engine, to preclude frequent rebuilding of the engine. Some single cylinder engines, such as are used to propel compressors for heat pumps, are required to have a service life, without rebuilding, of 40,000 hours. Even with the most responsively constructed check valve, there may be some delay between the onset of the negative pressure portion of the oscillation, and the seating of the check valve, so that the carburetor may be exposed to some negative pressure and induced fuel flow. In addition, such a check valve would likely have the characteristic that the breathing of the engine might be inhibited at high engine speeds, thus reducing the engine power at high speeds.

It would be desirable to provide an improved way to reduce or eliminate the impact of air system oscillations upon the air/fuel ratio of carburetted single cylinder internal combustion engines.

It also would be desirable to provide a way to prevent induced fuel flow into the carburetor, which can occur as a result of such air system oscillations.

It would be desirable to provide a way to attain the aforementioned goals without having an adverse effect upon other aspects of engine performance.

In addition, it would be desirable to provide an apparatus for counteracting the potentially undesirable consequences of such air system oscillations, without such apparatus having to be actuated in response to or upon sensing of such oscillations.

SUMMARY OF THE INVENTION

The present invention comprises, in part, an apparatus for facilitating the control of the air/fuel ratio for a single cylinder internal combustion engine having one combustion chamber having one air/fuel charge inlet and corresponding inlet valve or valves which is/are closed during at least a portion of each engine operating cycle, a carburetor, a source of air for delivery to the carburetor, a source of fuel for delivery to the carburetor, a passage extending between the source of air and the carburetor, and a passage extending between the carburetor and the air/fuel charge inlet.

The apparatus for facilitating the control of the air/fuel ratio comprises means for interrupting the flow of fuel from the source of fuel to the carburetor, operably disposed along a fluid flow path between the source of fuel and the carburetor and preferably as close as possible to the carburetor. Means are provided for actuating the means for interrupting the flow of fuel, operably configured to actuate the interrupting means during that portion of each engine operating cycle during which the at least one inlet valve is closed.

The interrupting means comprise a valve apparatus positioned along the passage between the source of fuel and the carburetor. Preferably, the valve apparatus comprises a valve member operably configured for reciprocating movement across the passage between the source of fuel and the carburetor between at least two positions, a first position permitting flow of fuel from the source of fuel past the valve member to the carburetor and a second position preventing flow of fuel from the source of fuel past the valve member to the carburetor.

In a preferred embodiment of the invention, the valve apparatus further comprises biasing means for normally biasing the valve member into the second position preventing flow of fuel from the source of fuel past the valve member to the carburetor.

The actuating means comprise an actuating apparatus operably configured to intermittently move the valve member into the first position permitting flow of fuel from the source of fuel past the valve member to the carburetor. The actuating apparatus comprises an inlet cam member, operably configured for causing the displacement of the at least one inlet valve member between at least a first position for permitting flow of an air/fuel charge from the carburetor to the air/fuel charge inlet for the cylinder, and at least a second position for precluding flow of an air/fuel charge from the carburetor to the air/fuel charge inlet for the cylinder. The inlet cam member is operably associated with the valve member, for causing opening of the passage between the source of fuel and the carburetor during at least a portion of the time that the at least one inlet valve member permits flow of an air/fuel charge from the carburetor to the air/fuel charge inlet for the cylinder.

Alternatively, the actuating apparatus comprises a cam member, disposed on a cam shaft of the engine, and operably configured for causing the displacement of the valve member for causing opening of the passage between the source of fuel and the carburetor during at least a portion of the time that the at least one inlet valve member permits flow of an air/fuel charge from the carburetor to the air/fuel charge inlet for the cylinder.

The invention also comprises, in part, a method for facilitating the control of the air/fuel ratio for an internal combustion engine having one combustion chamber having one air/fuel charge inlet and a corresponding inlet valve(s) which is/are closed during at least a portion of each engine operating cycle, a carburetor, a source of air for delivery to the carburetor, a source of fuel for delivery to the carburetor, a passage extending between the source of fuel and the carburetor, a passage extending between the source of air and the carburetor, a passage extending between the carburetor and the air/fuel charge inlet.

The method for facilitating the control of the air/fuel ratio comprises the steps of interrupting the flow of fuel from the source of fuel to the carburetor, with a fuel flow interrupting apparatus operably disposed along a fluid flow path between the source of fuel to the carburetor, with a fuel flow interrupting apparatus operably disposed along a fluid flow path between the source of fuel and the carburetor; and actuating the apparatus for interrupting the flow of fuel, with an actuating apparatus operably configured to actuate the interrupting means during that portion of each engine operating cycle during which the at least one inlet valve is closed.

The step of interrupting the fuel flow comprises the step of positioning a valve apparatus along the passage between the source of fuel and the carburetor.

The step of positioning a valve apparatus comprises the step of providing a valve member operably configured for reciprocating movement across the passage between the source of fuel and the carburetor between at least two positions, a first position permitting flow of fuel from the source of fuel past the valve member to the carburetor and a second position preventing flow of fuel form the source of fuel past the valve member to the carburetor.

The step of positioning a valve apparatus further comprises the step of biasing the valve member, with a biasing apparatus into the second position preventing flow of fuel from the source of fuel past the valve member to the carburetor.

The step of actuating the interrupting apparatus comprises the step of providing an actuating apparatus operably configured to intermittently move the valve member into the first position permitting flow of fuel from the source of fuel past the valve member to the carburetor.

The step of providing an actuating apparatus comprises the step of providing an inlet cam member, operably configured for causing the displacement of the at least one inlet valve member between at least a first position for permitting flow of an air/fuel charge from the carburetor to the air/fuel charge inlet for the cylinder, and at least a second position for precluding flow of an air/fuel charge from the carburetor to the air/fuel charge inlet for the cylinder. The inlet cam member being operably associated with the valve member, for causing opening of the passage between the source of fuel and the carburetor during at least a portion of the time that the at least one inlet valve member permits flow of an air/fuel charge from the carburetor to the air/fuel charge inlet for the cylinder.

Alternatively, the step of providing an actuating apparatus comprises the step of providing a cam member, disposed on a cam shaft of the engine, and operably configured for causing the displacement of the valve member for causing opening of the passage between the source of fuel and the carburetor during at least a portion of the time that the at least one inlet valve member permits flow of an air/fuel charge from the carburetor to the air/fuel charge inlet for the cylinder.

BEST MODE FOR CARRYING OUT THE INVENTION

Figure 1:
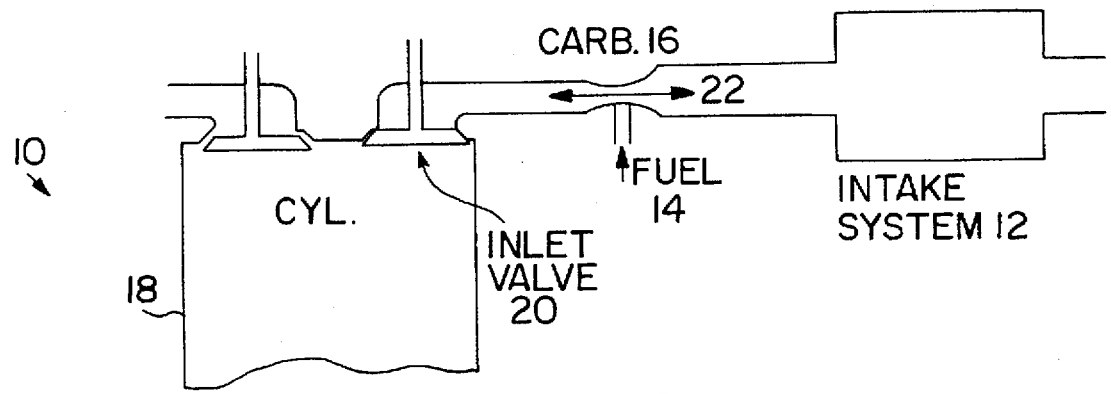
FIG. 1 is a schematic illustration of a portion of an internal combustion engine air and fuel supply system for a carburetted single cylinder engine.

While this invention is susceptible of embodiment in many different forms, there is shown in the drawings and will be described herein in detail, one or more preferred embodiments, with the understanding that the present disclosure is to be considered as an exemplification of the principles of the invention, and is not intended to limit the invention to the embodiment(s) illustrated.

FIG. 1 is a schematic illustration of a typical prior art single cylinder internal combustion engine 10, showing the delivery of air and fuel, from air intake/induction system 12 and fuel system 14, respectively, via a carburetor 16, to the cylinder 18 of the engine. It has been observed that in a typical single cylinder four stroke engine during that portion of the four-stroke cycle in which the inlet valve(s) 20 is/are closed, oscillations 22 of the air can occur in the throat of the carburetor under some conditions. During the negative (or suction or vacuum portions of the oscillations), fuel flow into the carburetor can be induced, with the undesired consequences previously described. This behavior is particularly evident in engines which are powered by gaseous fuel. It has been noted that this is not a concern if the engine is fuel injected, due to the structure and operation of the fuel injectors.

Figure 2:
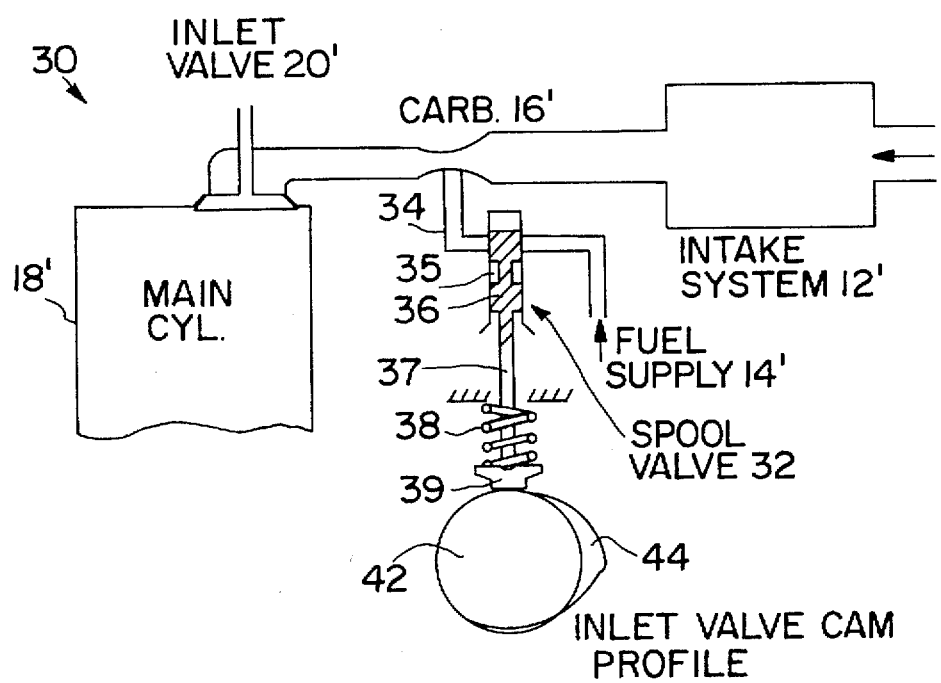
FIG. 2 is a schematic illustration of the air/fuel ratio control scheme according to the present invention.

FIG. 2 illustrates a scheme for precluding induced flow of fuel into a carburetor, according to a preferred embodiment of the invention, wherein like elements to those illustrated in FIG. 1 are provided with like reference numerals, augmented with a prime Engine 30 has one cylinder 18', a portion of which is illustrated schematically. Cylinder 18' is supplied with a charge of air and fuel via inlet valve 20', to which the charge of air and fuel is sent via carburetor 16'. Intake system 12' supplies carburetor 16' with air and fuel supply 14' supplies carburetor 16' with fuel. Such elements of engine 30 may be of otherwise conventional configuration, for four-stroke engines configured to be powered by fuels such as natural gas, propane, etc.

In order to prevent induced flow of fuel into carburetor 16', a control valve 32 is positioned in the fuel line 34 between the fuel supply 14' and the carburetor 16'. Control valve 32 may comprise an otherwise conventional valve spool 36, stem 37, biasing spring 38, and follower 39. Spring 38 will be positioned so that spool 36 will be biased into a downward position, cutting off the flow of fuel to carburetor 16'. Actuation of control valve 32 would be by a cam 42 rotationally positioned and time so that as follower 39 begins to encounter the eccentric portion 44 of cam 42, stem 37 is pushed upward to bring the passage portion 35 of spool 36 into alignment with fuel line 34, to permit flow of fuel from supply 14' to carburetor 16'. The timing of the opening and closing of control valve 32, can be selectively determined to be early or late in the opening of valve 20', or can substantially coincide with the cycle of opening of valve 20', as may be desired or called for by the operational characteristics of the particular engine. The contour of cam 42, the configuration of spool 36, and related dimensions and characteristics can be varied by one of ordinary skill in the art of engine design having the present disclosure before them, in order to attain the desired engine operational characteristics.

It is believed that control valve 32 does not have to have a particularly tight seal. In the environment of a gaseous fuel-consuming engine, control valve 32 will only need to block the flow of gas with only very modest pressure differentials, in the range of 0.2 to 0.4 psig. A "balanced" spool valve, as opposed to a "poppet" type valve, is contemplated as having satisfactory expected operational characteristics. The functional objective of the valve is to make the carburetor unable to deliver any fuel to the cylinder during the air flow oscillations which can occur while the inlet valve to the cylinder is closed.

Since the purpose of the present invention, is to render the engine substantially immune to the adverse effects of the air supply oscillations, actuation of the control valve should not be tied to or actuated by the air flow through the air supply or carburetor. Accordingly, it would be inappropriate to actuate the control valve, for example, by using a spring to close the control valve, and using inlet vacuum to open the control valve. Such a configuration would be influenced, possibly adversely, by engine speed and throttle position, and possibly by the oscillations in the inlet system which the present invention is intended to offset.

Stroking of the control valve accordingly is contemplated as being accomplished in a manner directly not influenced by the intake system (specifically the air flow characteristics, such as the oscillations described earlier) of the engine. Several alternative methods of stroking the control valve are contemplated for the present invention, including:

a. stroking the control valve via the inlet valve cam on the engine camshaft or by a suitably configured cam which is added to the camshaft;
   b. positioning the control valve in the cylinder head or top deck of the engine and stroking the control valve with the inlet valve rocker arm;
   c. stroking the control valve via the inlet valve push rod;
   d. positioning the control valve near the carburetor and stroking it with a hydraulic line fed by the engine oil pump via a 3-way oil timing valve;
   e. positioning the valve near the carburetor and stroking it with a solenoid or automotive type PWM (pulse width modulated) solenoid, but not used in a PWM mode. The solenoid could be driven by the engine electronic control system. If the engine lacks an electronic control system, the solenoid could be driven via a set of ignition points.

Each of these proposed stroking schemes may be readily implemented by one of ordinary skill in the art having the present disclosure before them. Accordingly, no further detail or illustration is necessary for a complete understanding of the invention by one of ordinary skill in the art.

The scheme of FIG. 2 corresponds to scheme a. above, which is believed to be possibly more attractive than the other listed schemes in terms of potential reliability, and production cost, although the principles of the invention are believed to be substantially equally applicable to all of the proposed stroking schemes.

It should be noted that the invention could conceivably be applied to a 2-stroke, single cylinder engine although the need for this has not currently been demonstrated. In a 2-stroke engine version the control valve could be stroked by a cam on the main crankshaft.

The carburetor air/fuel ratio control apparatus according to the present invention is believed to have several potential advantages, including: more precision of the air/fuel ratio control relative to engine load and speed; potential improvement in all important emissions; and more freedom in engine inlet system design, without adverse effects on engine breathing and heavy duty performance durability.

It is believed that the method and apparatus of the present invention is inappropriate, as a general matter, for multicylinder engines, and engines such as Wankel rotary engines. There is not believed to be any evidence that the oscillation behavior which the present invention is intended to address currently occurs to any significant degree in multicylinder and rotary engines.

Further, the typical multicylinder engine is either fuel injected, or in non-fuel injected engines, at most two carburetors are provided, serving 3 or 4 cylinders each. In either event, if an apparatus were provided according to the present invention, to interdict flow to the carburetor when the valves of one of the cylinders were closed, due to the staggering of the firing order of the cylinders, certainly at least one of the other cylinders would have its valves open, needing fuel and air. The air/fuel mixture for such "other" cylinders would be substantially disrupted. The only way that a multicylinder engine could make potential use of the present invention would be if each cylinder were separately carburetted, and a separate fuel control valve for each carburetor were provided, resulting in an extremely costly and complex mechanism. Since, as stated, the oscillation "problem" does not appear to occur significantly, if at all, in multicylinder engines, then the present invention would not appear to be applicable to or appropriate for such engines.

Rotary engines, such as Wankel engines, likewise appear not to suffer from oscillation problems. In addition, a typical rotary engine behaves in a manner that the air flow into the engine is essentially continuous and the fuel is substantially continuously being inletted into the engine. As such, the inlet ports are almost continuously open, and the control valve construction of the present invention, probably could not be effectively used.

The foregoing description and drawings merely serve to illustrate the invention and the invention is not limited thereto except insofar as the appended claims are so limited, as those skilled in the art who have the disclosure before them will be able to make modifications and variations therein without departing from the scope of the invention.

What is claimed is:

1. An apparatus for facilitating the control of the air/fuel ratio for a single cylinder internal combustion engine having an air/fuel charge inlet and a corresponding at least one inlet valve which is closed during at least a portion of each engine operating cycle, a carburetor, a source of air for delivery to the carburetor, a source of fuel for delivery to the carburetor, a passage extending between the source of fuel and the carburetor, a passage extending between the source of air and the carburetor, a passage extending between the carburetor and the air/fuel charge inlet; the apparatus for facilitating the control of the air/fuel ratio comprising:

means, disposed external to the carburetor, for interrupting the flow of fuel from the source of fuel to the carburetor, operably disposed along a fluid flow path between the source of fuel and the carburetor;

means for actuating the means for interrupting the flow of fuel, operably configured to actuate the interrupting means during that portion of each engine operating cycle during which the at least one inlet valve is closed, the timing of the actuating means being mechanically controlled.

2. The apparatus according to claim 1, wherein the interrupting means comprises:

a valve apparatus positioned along the passage between the source of fuel and the carburetor.

3. The apparatus according to claim 2, wherein the valve apparatus comprises:

a valve member operably configured for reciprocating movement across the passage between the source of fuel and the carburetor between at least two positions, a first position permitting flow of fuel from the source of fuel past the valve member to the carburetor and a second position preventing flow of fuel from the source of fuel past the valve member to the carburetor.

4. The apparatus according to claim 3, wherein the valve apparatus further comprises:

biasing means for normally biasing the valve member into the second position preventing flow of fuel from the source of fuel past the valve member to the carburetor.

5. The apparatus according to claim 3, wherein the actuating means comprise:

an actuating apparatus operably configured to intermittently move the valve member into the first position permitting flow of fuel from the source of fuel past the valve member to the carburetor.

6. An apparatus for facilitating the control of the air/fuel ratio for a single cylinder internal combustion engine having an air/fuel charge inlet and a corresponding at least one inlet valve which is closed during at least a portion of each engine operating cycle, a carburetor, a source of air for delivery to the carburetor, a source of fuel for delivery to the carburetor, a passage extending between the source of fuel and the carburetor, a passage extending between the source of air and the carburetor, a passage extending between the carburetor and the air/fuel charge inlet, the apparatus for facilitating the control of the air/fuel ratio comprising:

means for interrupting the flow of fuel from the source of fuel to the carburetor, operably disposed along a fluid flow path between the source of fuel and the carburetor;

means for actuating the means for interrupting the flow of fuel, operably configured to actuate the interrupting means during that portion of each engine operating cycle during which the at least one inlet valve is closed;

the interrupting means comprising a valve apparatus positioned along the passage between the source of fuel and the carburetor, the valve apparatus including a valve member operably configured for reciprocating movement across the passage between the source of fuel and the carburetor between at least two positions, a first position permitting flow of fuel from the source of fuel past the valve member to the carburetor and a second position preventing flow of fuel from the source of fuel past the valve member to the carburetor;

the actuating means comprising an actuating apparatus operably configured to intermittently move the valve member into the first position permitting flow of fuel from the source of fuel past the valve member to the carburetor; in turn comprising an inlet cam member, operably configured for causing the displacement of the at least one inlet valve member between at least a first position for permitting flow of an air/fuel charge from the carburetor to the air/fuel charge inlet for the cylinder, and at least a second position for precluding flow of an air/fuel charge from the carburetor to the air/fuel charge inlet for the cylinder, the inlet cam member being operably associated with the valve member, for causing opening of the passage between the source of fuel and the carburetor during at least a portion of the time that the at least one inlet valve member permits flow of an air/fuel charge from the carburetor to the air/fuel charge inlet for the cylinder.

7. An apparatus for facilitating the control of the air/fuel ratio for a single cylinder internal combustion engine having an air/fuel charge inlet and a corresponding at least one inlet valve which is closed during at least a portion of each engine operating cycle, a carburetor, a source of air for delivery to the carburetor, a source of fuel for delivery to the carburetor, a passage extending between the source of fuel and the carburetor, a passage extending between the source of air and the carburetor, a passage extending between the carburetor and the air/fuel charge inlet, the apparatus for facilitating the control of the air/fuel ratio comprising:

means for interrupting the flow of fuel from the source of fuel to the carburetor, operably disposed along a fluid flow path between the source of fuel and the carburetor;

means for actuating the means for interrupting the flow of fuel, operably configured to actuate the interrupting means during that portion of each engine operating cycle during which the at least one inlet valve is closed;

the interrupting means comprising a valve apparatus positioned along the passage between the source of fuel and the carburetor, the valve apparatus including a valve member operably configured for reciprocating movement across the passage between the source of fuel and the carburetor between at least two positions, a first position permitting flow of fuel from the source of fuel past the valve member to the carburetor and a second position preventing flow of fuel from the source of fuel past the valve member to the carburetor;

the actuating means comprising an actuating apparatus operably configured to intermittently move the valve member into the first position permitting flow of fuel from the source of fuel past the valve member to the carburetor; in turn comprising a cam member, disposed on a cam shaft of the engine, and operably configured for causing the displacement of the valve member for causing opening of the passage between the source of fuel and the carburetor during at least a portion of the time that the at least one inlet valve member permits flow of an air/fuel charge from the carburetor to the air/fuel charge inlet for the cylinder.

8. A method for facilitating the control of the air/fuel ratio for a single cylinder internal combustion engine having an air/fuel charge inlet and a corresponding at least one inlet valve which is closed during at least a portion of each engine operating cycle, a carburetor, a source of air for delivery to the carburetor, a source of fuel for delivery to the carburetor, a passage extending between the source of fuel and the carburetor, a passage extending between the source of air and the carburetor, a passage extending between the carburetor and the air/fuel charge inlet; the method for facilitating the control of the air/fuel ratio comprising:

interrupting the flow of fuel from the source of fuel to the carburetor, with a fuel flow interrupting apparatus operably disposed, external to the carburetor, along a fluid flow path between the source of fuel and the carburetor;

actuating the apparatus for interrupting the flow of fuel, with an actuating apparatus operably configured to actuate the interrupting means during that portio of each engine operating cycle during which the at least one inlet valve is closed, the timing of the actuating means being mechanically controlled.

9. The method according to claim 8, wherein the step of interrupting the fuel flow comprises the step of:

positioning a valve apparatus along the passage between the source of fuel and the carburetor.

10. The method according to claim 9, wherein the step of positioning a valve apparatus comprises the step of:

providing a valve member operably configured for reciprocating movement across the passage between the source of fuel and the carburetor between at least two positions, a first position permitting flow of fuel from the source of fuel past the valve member to the carburetor and a second position preventing flow of fuel from the source of fuel past the valve member to the carburetor.

11. The method according to claim 10, wherein the step of positioning a valve apparatus further comprises the step of:

biasing the valve member, with a biasing apparatus into the second position preventing flow of fuel from the source of fuel past the valve member to the carburetor.

12. The method according to claim 10, wherein the step of actuating the interrupting apparatus comprises the step of:

providing an actuating apparatus operably configured to intermittently move the valve member into the first position permitting flow of fuel from the source of fuel past the valve member to the carburetor.

13. A method for facilitating the control of the air/fuel ratio for a single cylinder internal combustion engine having an air/fuel charge inlet and a corresponding at least one inlet valve which is closed during at least a portion of each engine operating cycle, a carburetor, a source of air for delivery to the carburetor, a source of fuel for delivery to the carburetor, a passage extending between the source of fuel and the carburetor, a passage extending between the source of air and the carburetor, a passage extending between the carburetor and the air/fuel charge inlet, the method for facilitating the control of the air/fuel ratio comprising:

interrupting the flow of fuel from the source of fuel to the carburetor, with the fuel flow interrupting apparatus operably disposed along a fluid flow path between the source of fuel and the carburetor;

actuating the apparatus for interrupting the flow of fuel, with an actuating apparatus operably configured to actuate the interrupting means during that portion of each engine operating cycle during which the at least one inlet valve is closed;

the step of interrupting the fuel flow comprising the step of positioning a valve apparatus along the passage between the source of fuel and the carburetor;

the step of positioning a valve apparatus comprising the step of providing a valve member operably configured for reciprocating movement across the passage between the source of fuel and the carburetor between at least two positions, a first position permitting flow of fuel from the source of fuel past the valve member to the carburetor and a second position preventing flow of fuel from the source of fuel past the valve member to the carburetor;

the step of actuating the interrupting apparatus comprising the step of providing an actuating apparatus operably configured to intermittently move the valve member into the first position permitting flow of fuel from the source of fuel past the valve member to the carburetor;

in turn comprising the step of providing an inlet cam member, operably configured for causing the displacement of the at least one valve member between at least a first position for permitting flow of an air/fuel charge from the carburetor to the air/fuel charge inlet for the cylinder, and at least a second position for precluding flow of an air/fuel charge from the carburetor to the air/fuel charge inlet for the cylinder, the inlet cam member being operably associated with the valve member, for causing opening of the passage between the source of fuel and the carburetor during at least a portion of the time that the at least one inlet valve member permits flow of an air/fuel charge from the carburetor to the air/fuel charge inlet for the cylinder.

14. A method for facilitating the control of the air/fuel ratio for a single cylinder internal combustion engine having an air/fuel charge inlet and a corresponding at least one inlet valve which is closed during at least a portion of each engine operating cycle, a carburetor, a source of air for delivery to the carburetor, a source of fuel for delivery to the carburetor, a passage extending between the source of fuel and the carburetor, a passage extending between the source of air and the carburetor, a passage extending between the carburetor and the air/fuel charge inlet, the method for facilitating the control of the air/fuel ratio comprising:

interrupting the flow of fuel from the source of fuel to the carburetor, with the fuel flow interrupting apparatus operably disposed along a fluid flow path between the source of fuel and the carburetor;

actuating the apparatus for interrupting the flow of fuel, with an actuating apparatus operably configured to actuate the interrupting means during that portion of each engine operating cycle during which the at least one inlet valve is closed;

the step of interrupting the fuel flow comprising the step of positioning a valve apparatus along the passage between the source of fuel and the carburetor;

the step of positioning a valve apparatus comprising the step of providing a valve member operably configured for reciprocating movement across the passage between the source of fuel and the carburetor between at least two positions, a first position permitting flow of fuel from the source of fuel past the valve member to the carburetor and a second position preventing flow of fuel from the source of fuel past the valve member to the carburetor;

the step of actuating the interrupting apparatus comprising the step of providing an actuating apparatus operably configured to intermittently move the valve member into the first position permitting flow of fuel from the source of fuel past the valve member to the carburetor;

in turn comprising the step of providing a cam member, disposed on a cam shaft of the engine, and operably configured for causing the displacement of the valve member for causing opening of the passage between the source of fuel and the carburetor during at least a portion of the time that the at least one inlet valve member permits flow of an air/fuel charge from the carburetor to the air/fuel charge inlet for the cylinder.

* * * * *